(12) United States Patent
West et al.

(10) Patent No.: US 6,598,407 B2
(45) Date of Patent: Jul. 29, 2003

(54) METHOD AND APPARATUS FOR EFFICIENT INJECTION OF $CO_2$ IN OCEANS

(75) Inventors: Olivia R. West, Knoxville, TN (US); Constantinos Tsouris, Oak Ridge, TN (US); Liyuan Liang, Lisvane (GB)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/981,126

(22) Filed: Oct. 16, 2001

(65) Prior Publication Data

US 2003/0070435 A1 Apr. 17, 2003

(51) Int. Cl.⁷ .............................................. F17C 1/00
(52) U.S. Cl. ........................................ 62/53.1; 588/250
(58) Field of Search ............................ 62/53.1; 588/250

(56) References Cited

U.S. PATENT DOCUMENTS

| | | | | |
|---|---|---|---|---|
| 5,293,751 A | * | 3/1994 | Asai ............................. | 62/53.1 |
| 5,364,611 A | * | 11/1994 | Iijima et al. .................. | 588/250 |
| 5,405,595 A | * | 4/1995 | Tomikawa et al. ........... | 588/250 |
| 5,544,491 A | * | 8/1996 | Ozaki et al. .................. | 62/53.1 |
| 5,562,891 A | * | 10/1996 | Spencer et al. ............... | 62/53.1 |

OTHER PUBLICATIONS

J. A. Caulfield et al, "Near Field Impacts of Reduced pH from Ocean CO2 Disposal," Energy Convers. Mgmt, p. S343–348, (1997). vol. 38.

H. J. Herzog, "Ocean Sequestration of CO2—An Overview," Fourth International Conference on Greenhouse Gas Control Technologies, p. 1–7, (Aug. 30–Sep. 2, 1998).

J. J. Morgan et al, "Hydrate Formation from Gaseous CO2 and Water," Environ. Sci. Technol., p. 1448–1452, (1999). vol. 33.

S. Hirai et al, "Advanced CO2 Ocean Dissolution Technology for Longer Term Sequestration with Minimum Biological Impacts," Greenhouse Gas Control Technologies, Elsevier Science, Ltd., p. 317–322, (1999).

A. Yamasaki et al, "A New Ocean Disposal Scenario for Anthropogenic CO2:CO2 Hydrate Formation in a Submerged Crystallizer and its Disposal," Energy, p. 85–96, (2000). vol. 25.

T. J. Phelps et al, "A New Experimental Facility for Investigating the Formation and Properties of Gas Hydrates under Simulated Seafloor Conditions," Rev. Sci. Instrum., vol. 72 (No. 2), p. 1514–1521, (2001).

* cited by examiner

Primary Examiner—Ronald Capossela
(74) Attorney, Agent, or Firm—James M. Spicer

(57) ABSTRACT

A liquid $CO_2$ injection system produces a negatively buoyant consolidated stream of liquid $CO_2$, $CO_2$ hydrate, and water that sinks upon release at ocean depths in the range of 700–1500 m. In this approach, seawater at a predetermined ocean depth is mixed with the liquid $CO_2$ stream before release into the ocean. Because mixing is conducted at depths where pressures and temperatures are suitable for $CO_2$ hydrate formation, the consolidated stream issuing from the injector is negatively buoyant, and comprises mixed $CO_2$-hydrate/$CO_2$-liquid/water phases. The "sinking" characteristic of the produced stream will prolong the metastability of $CO_2$ ocean sequestration by reducing the $CO_2$ dissolution rate into water. Furthermore, the deeper the $CO_2$ hydrate stream sinks after injection, the more stable it becomes internally, the deeper it is dissolved, and the more dispersed is the resulting $CO_2$ plume. These factors increase efficiency, increase the residence time of CO2 in the ocean, and decrease the cost of $CO_2$ sequestration while reducing deleterious impacts of free $CO_2$ gas in ocean water.

4 Claims, 4 Drawing Sheets

METHOD AND APPARATUS FOR EFFICIENT INJECTION OF $CO_2$ IN OCEANS

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

1. Field of the Invention

The invention relates to methods for direct injection of $CO_2$ into the ocean for carbon sequestration. More particularly, it relates to the production of a negatively buoyant $CO_2$ hydrate in the form of a consolidated $CO_2$-hydrate/$CO_2$-liquid/water stream that sinks upon release at intermediate ocean depths of about 1000 m.

2. Background Information

The concentration of carbon dioxide ($CO_2$) in the atmosphere is steadily increasing as a result of both land use changes and the combustion of fossil fuels for energy production. Due to the enhanced greenhouse effect caused by increasing concentrations of $CO_2$ and other greenhouse gases in the atmosphere (e.g., methane), it is predicted that greater amounts of heat will be retained within the atmosphere leading to a gradual increase in the surface temperature of the earth. Reducing the potential risks of human-induced global climate change will require that means be found to slow the rate of increase in atmospheric $CO_2$ levels. One of the strategies is to capture and sequester $CO_2$ by enhancing the natural capacity of the terrestrial biosphere and the oceans to take up and store carbon.

Direct injection of $CO_2$ into the ocean has been proposed as a means for carbon sequestration because it offers a large storage capacity for carbon (Herzog 1998). Depending on the depth of injection as well as the subsequent interaction of $CO_2$ with seawater, the residence time of $CO_2$ in the ocean can be on the order of several hundred years, leading to significantly reduced rates of atmospheric $CO_2$ increase as well as lower peak levels. The thermodynamic properties of $CO_2$ and seawater, in combination with ambient pressure and emplacement methodology, will strongly influence the form and subsequent fate of $CO_2$ that is injected into the ocean. For example, at depths less than ~500 m, $CO_2$ will be a gas and will therefore be more likely to partition back into the atmosphere within decades to centuries. At depths between ~500 and ~2600 m, the density of liquid $CO_2$ is lower than that of seawater. At greater depths, liquid $CO_2$ is denser than the surrounding seawater. Thus, $CO_2$ injected at depths between 500 and 2600 m will be in liquid form and will tend to rise (i.e., be positively buoyant), while $CO_2$ released at depths >2600 m will sink (i.e., be negatively buoyant).

Direct ocean $CO_2$ injection will be considered successful if the following conditions are met: the residence time of $CO_2$ released in the ocean is on the order of several centuries or more; negligible environmental impacts are associated with the release; the energy requirement for the ocean emplacement is small relative to that obtained from $CO_2$ generation; and the process is cost-effective.

Several methods for direct $CO_2$ injection have been suggested. These include: (1) injection at moderate depths of 1000–2000 m through a fixed or towed pipe resulting in a rising liquid $CO_2$ droplet plume; (2) injections into ocean floor depressions at depths >2600 m forming a $CO_2$ lake; (3) disposal as dry ice; and (4) shallow discharge as a dense solution of seawater with dissolved $CO_2$ forming a dense sinking liquid plume. These and other methods are reviewed in the recent papers of Caulfield (1997) and Herzog (1998).

Because emplacement costs increase significantly with injection depth, the lowest cost is anticipated for the dense-plume approach (alternative 4), which requires injection depths between 500 and 1000 m. However, the low cost of implementation for this approach may be offset by the negative environmental impact on the marine ecosystem that would result from a highly concentrated $CO_2$ composition and low pH in the vicinity of the sinking dense plume. Injection at depths >1000 m is therefore believed to have lesser environmental impacts and lower rates of release to the atmosphere. A high cost is associated with the $CO_2$-lake disposal (alternative 2) because of the need for special pipelines that can withstand hydrostatic pressures at the required injection depth (>2600 m) where $CO_2$ becomes denser than seawater. Dry ice (alternative 3) can be discharged at shallow depths, however, its production and handling cost can be very high.

When compared to the other disposal alternatives, droplet plume disposal at injection depths of 1000–2000 m (Alternative 1) appears to be the most favorable when factors such as development cost, difficulty and environmental impacts are considered. As $CO_2$ is only slightly miscible with seawater, the $CO_2$-seawater system is hydrodynamically unstable, and liquid $CO_2$ discharged into seawater will break up into droplets due to interfacial instability. The droplets will rise because injection depths are shallower than the ~2600-m required for $CO_2$ to be negatively buoyant in seawater. To ensure that the rising $CO_2$ droplets completely dissolve into the seawater before it reaches depths where $CO_2$ becomes gaseous (~500 m), sufficient injection depth (>1500 m) is required.

The preceding review of current research shows that the positive buoyancy of $CO_2$ droplets has a negative impact on the long-term environmental success of liquid $CO_2$ injections at intermediate depths. In addition, although $CO_2$ is in liquid state at depths >500 m, injections must be performed at depths greater than 1500 m to ensure that rising $CO_2$ drops dissolve completely before reaching the critical 500-m depth threshold.

Our invention is a $CO_2$ injection method based on the production of a new $CO_2$ injection form, comprising of a consolidated $CO_2$-liquid/$CO_2$-hydrate/water paste-like stream, that sinks at shallower depths than other $CO_2$ forms. To date, no studies discussing generation of a negatively buoyant $CO_2$-liquid/$CO_2$-hydrate/water consolidated stream for ocean sequestration have been reported. The result is the achievement of cost savings without the negative environmental impact of other shallow depth injection methods.

REFERENCES

1. J. A. Caulfield, D. I. Auerbach, E. E. Adams and H. J. Herzog, "Near Field Impacts of reduced pH from Ocean $CO_2$ Disposal", *Energy Convers. Mgmt.* Vol. 38, pp. S343–348 (1997).
2. H. J. Herzog, "Ocean Sequestration of $CO_2$— An Overview", Fourth International Conference on Greenhouse Gas Control Technologies, Interlaken, Switzerland, pp. 1–7, Aug. 30–Sep. 2, 1998.
3. J. J. Morgan, V. R. Blackwell, D. E. Johnson, D. F. Spencer and W. J. North, "Hydrate Formation from Gaseous $CO_2$ and Water", *Environ. Sci. Technol.* Vol. 33, pp. 1448–1452 (1999).

4. S. Hirai, Y. Tabe, G. Tanaka and K. Okazaki, "Advanced $CO_2$ Ocean Dissolution Technology for Longer Term Sequestration with Minimum Biological Impacts", *Greenhouse Gas Control Technologies*, P. Riemer, B. Eliasson and A. Wokaun, editors, Elsevier Science, Ltd., pp. 317–322 (1999).
5. A. Yamasaki, M. Wakatsuki, H. Teng, Y. Yanagisawa and K. Yamada, "A New Ocean Disposal Scenario for Anthropogenic $CO_2$: $CO_2$ Hydrate Formation in a Submerged Crystallizer and its Disposal", Energy Vol. 25, pp. 86–96 (2000).
6. T. J. Phelps, D. J. Peters, S. L. Marshall, O. R. West, L. Liang, J. G. Blencoe, V. Alexiades, G. K. Jacobs, M. T. Naney and J. L. Heck, Jr., "A New Experimental Facility for Investigating the formation and Properties of Gas Hydrates under Simulated Seafloor Conditions", *Rev. Sci. Instrum.* Vol. 72, No. 2, pp. 1514–1521 (2001).

OBJECTS OF THE INVENTION

It is a first object of the invention to provide a consolidated $CO_2$-hydrate/$CO_2$-liquid/water stream that sinks upon release at intermediate ocean depths of about 1000 m.

Another object of the invention is to reduce pressurization of $CO_2$ liquid for ocean injection by providing a negatively buoyant $CO_2$ stream for injection at shallower depths.

Another object of the invention is to provide a $CO_2$ injection form having a longer residence time in the ocean.

A further object of the invention is to dissolve $CO_2$ slowly, imposing minimal environmental impact.

A still further object of the invention is to provide efficient and economical $CO_2$ disposal in the ocean.

Yet another object of the invention is to provide a $CO_2$ disposal method that is compatible with current pipeline delivery systems.

BRIEF SUMMARY OF THE INVENTION

In a first embodiment, the invention is a method for continuous production of a hydrate-containing stream that comprises the steps of delivering a fluid containing hydrate-forming species to a pressurized, temperature controlled, continuous-flow reactor; and mixing the fluid containing hydrate-forming species with water until a consolidated hydrate-fluid-water stream is formed.

In another embodiment, the invention is a method for sequestering $CO_2$ in the ocean that comprises the steps of pumping liquid $CO_2$ into a discharge pipe located at a predetermined ocean depth; pumping seawater from the predetermined ocean depth into the discharge pipe; sufficiently mixing the liquid $CO_2$ with the seawater from the predetermined ocean depth for a sufficient amount of time until a paste-like consolidated $CO_2$-hydrate/$CO_2$-liquid/water stream is formed; and discharging the paste-like consolidated $CO_2$-hydrate/$CO_2$-liquid/water stream into the ocean.

BRIEF DESCRIPTION OF THE DRAWINGS

FIG. 3(*a*) shows a drop of liquid $CO_2$ released in water with no premixing with water; FIG. 3(*b*) shows the transition from drops to a consolidated stream by mixing liquid $CO_2$ with water; FIG. 3(*c*) shows a steady flow of the negatively buoyant consolidated stream; and FIG. 3(*d*) shows the injector at continuous operation.

DETAILED DESCRIPTION OF THE INVENTION

The $CO_2$ injection system of this invention is designed to produce a paste-like negatively buoyant seawater $CO_2$-hydrate/$CO_2$-liquid/water consolidated stream that sinks upon release at shallow ocean depths (~1000 m) as an alternative to other current $CO_2$ ocean disposal methods. In this approach, seawater is mixed with the liquid $CO_2$ stream before release into the ocean. Because mixing is conducted at depths where pressures and temperatures are suitable for $CO_2$ hydrate formation, a negatively buoyant consolidated stream comprising mixed $CO_2$-hydrate/$CO_2$-liquid/water phases issues from the injector. The negatively buoyant consolidated stream, in combination with a slower dissolution rate for $CO_2$ hydrates, prolong the metastability of $CO_2$ ocean sequestration.

The invention utilizes intense mixing of liquid CO2 and seawater to form many hydrate-encased seawater and CO2 droplets (primary particles) which then consolidate into a paste-like $CO_2$-liquid/$CO_2$-hydrate/water stream. A higher water volume fraction will lead to a $CO_2$-liquid/$CO_2$-hydrate/water consolidated stream with a higher bulk density because (1) more $CO_2$ hydrate will be formed (density= 1.12 g/mL) and (2) the stream will contain less $CO_2$ liquid, which has lower density than water.

Figure 1:
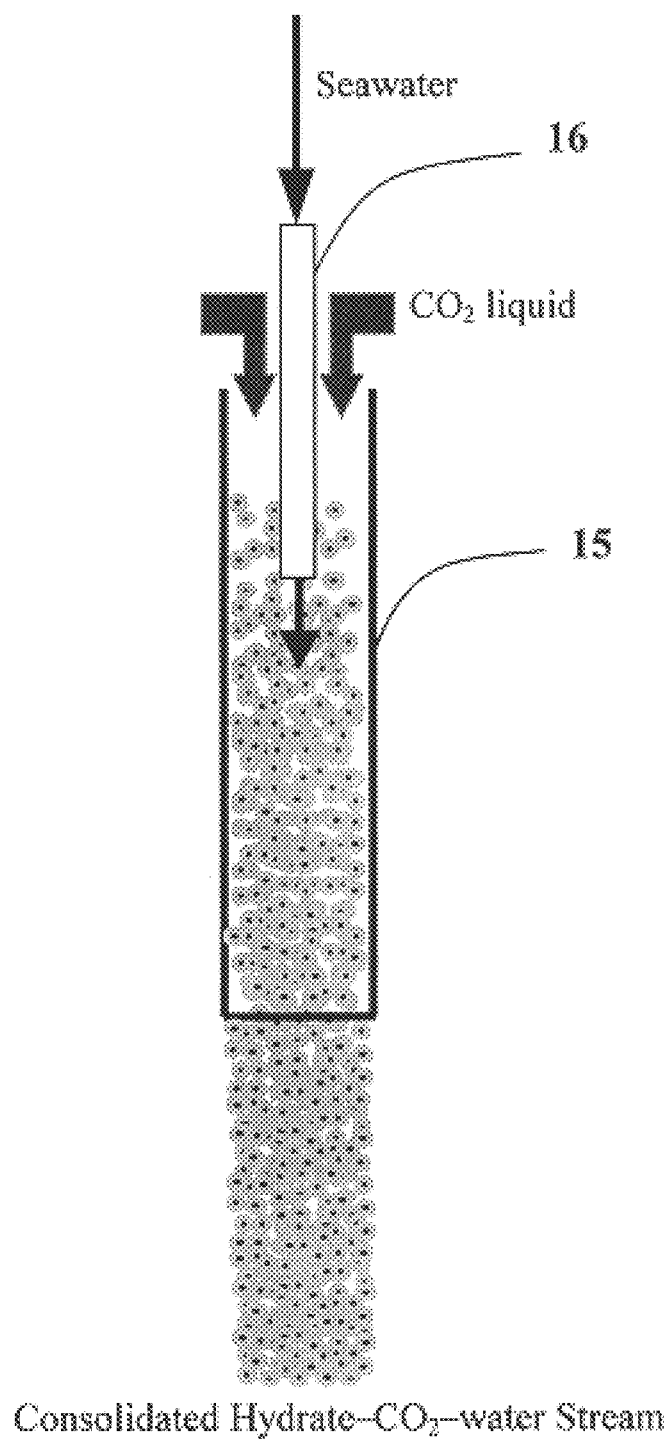
FIG. 1 illustrates one embodiment of the present invention. Liquid $CO_2$ is mixed with seawater at a predetermined moderate ocean depth to form a paste-like $CO_2$-liquid/$CO_2$-hydrate/water consolidated stream that is discharged into the ocean and sinks because it is heavier than the surrounding seawater at that depth.

Details of the invention are shown in FIG. 1. A discharge pipe 15 is maintained at a predetermined ocean depth, and liquid $CO_2$ is pumped into the pipe 15. Seawater from the predetermined ocean depth is pumped into the pipe 15 through a second pipe 16. By this means, the seawater and liquid $CO_2$ are contacted in the pipe 15 at high Reynolds numbers to ensure turbulent conditions. Intense mixing at the point of contact leads to the formation of fine water droplets in $CO_2$.

The formation of droplets increases the interfacial area between the water and $CO_2$ phases, which enhances the rate of $CO_2$ hydrate formation. By adjusting the residence time of the fluid in the nozzle, the ratio of the three phases (water, $CO_2$ hydrate, and liquid $CO_2$) can be controlled at the exit of the nozzle. The composition of the three phases determines the bulk density of the stream. Since $CO_2$ hydrate has a density higher than water, it is possible to have a consolidated stream of the three phases with higher bulk density than the surrounding water.

Figure 2:
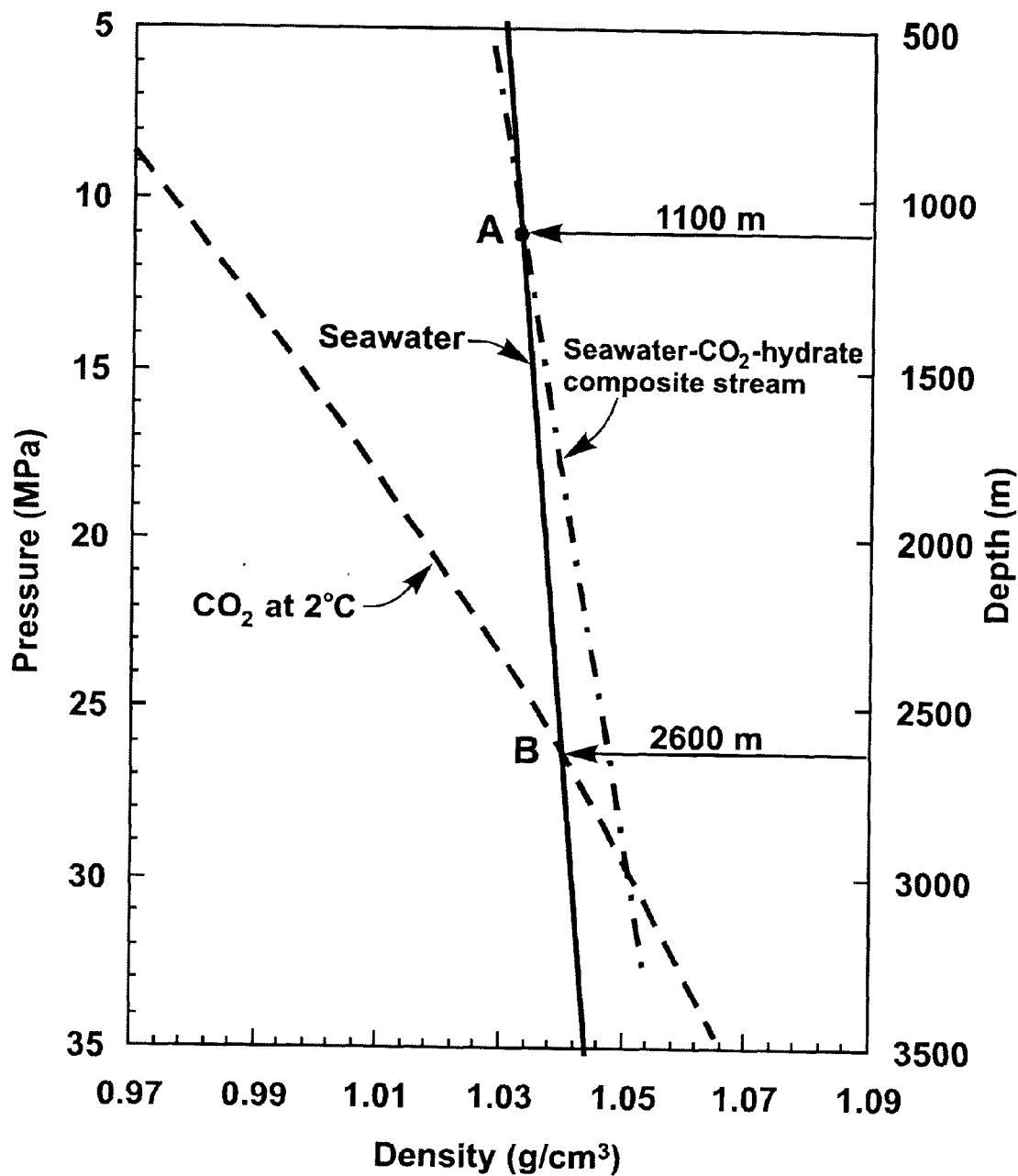
FIG. 2 is a graph of density as a function of pressure and ocean depth for liquid $CO_2$, seawater, and an example stream of consolidated seawater-$CO_2$-hydrate phases. The example consolidated stream consists of a 3:1 volumetric ratio of seawater to $CO_2$ where ~3% of the $CO_2$ is in hydrate form. Point A is where the consolidated stream becomes neutrally buoyant in seawater. Point B is where pure $CO_2$ becomes neutrally buoyant.

The mixing of seawater with a liquid $CO_2$ stream using the $CO_2$ injection device shown in FIG. 1 is thus able to produce a negatively buoyant hydrate-containing stream at shallower depths, potentially reducing the cost and minimizing the risk of $CO_2$ being released back to the atmosphere. The concept underlying the injection system design is further shown in FIG. 2, in which densities are plotted vs. ocean depth (or pressure) for seawater; liquid $CO_2$ (at 2° C.); and a paste-like stream consisting of consolidated $CO_2$-hydrate/$CO_2$-liquid/water phases. The paste-like stream was formed by mixing seawater and $CO_2$ at a 3:1 volumetric ratio, and ~3% of the $CO_2$ was assumed to be converted to hydrate. Because the density of $CO_2$ hydrate is ~10% greater than that of seawater, a consolidated stream containing a small amount of $CO_2$ hydrate can have a higher bulk density than that of the surrounding seawater at ~1100 m (FIG. 2, Point A). Thus, this consolidated stream will sink when released at a minimum depth of 1100 m, ~1500 m shallower than the depth at which pure $CO_2$ (at 2° C.) is denser than seawater (FIG. 2, Point B).

Various mixing devices can be designed to form $CO_2$-hydrate/$CO_2$-liquid/water consolidated streams. The common features of these devices are: (1) contacting seawater with $CO_2$ in a wide range of water volume fractions to form an emulsion where small drops of one fluid are dispersed into the other fluid, and (2) allowing a sufficient time for $CO_2$ hydrate to be formed on the interfacial areas between the $CO_2$ and seawater in the emulsion, eventually forming a paste-like consolidated stream of CO2 hydrate-liquid CO2-seawater phases. Examples of specific mixing devices include static or electrically-powered mixing blades emplaced in the $CO_2$ discharge pipeline section where $CO_2$ and water come together. Entrainment and mixing of seawater with the $CO_2$ in the $CO_2$ discharge pipeline can also be achieved through a venturi or jet pump.

A laboratory test facility known as the Seafloor Process Simulator (SPS, Phelps 2001) located at the Oak Ridge National Laboratory was used to produce the consolidated $CO_2$ hydrate of this invention using a laboratory-scale version of the injector shown in FIG. 1. The SPS is made from Hastelloy C-22 (selected for resistance to seawater corrosion) with a reaction volume of 70 L (31.75-cm internal diameter, 91.4-cm internal height). A refrigerated, walk-in cooler provides temperature control for the vessel. The vessel is equipped with sapphire windows for visual observations and recording, as well as sampling ports for material collection and measuring devices such as thermocouples, pressure transducers, and pH probes. The vessel is also equipped with fluid delivery and recovery systems that allows fluid flow while maintaining constant pressurization. The SPS provides a well-controlled environment for conducting experimental simulations of liquid $CO_2$ injection on a small scale.

Figure 3:
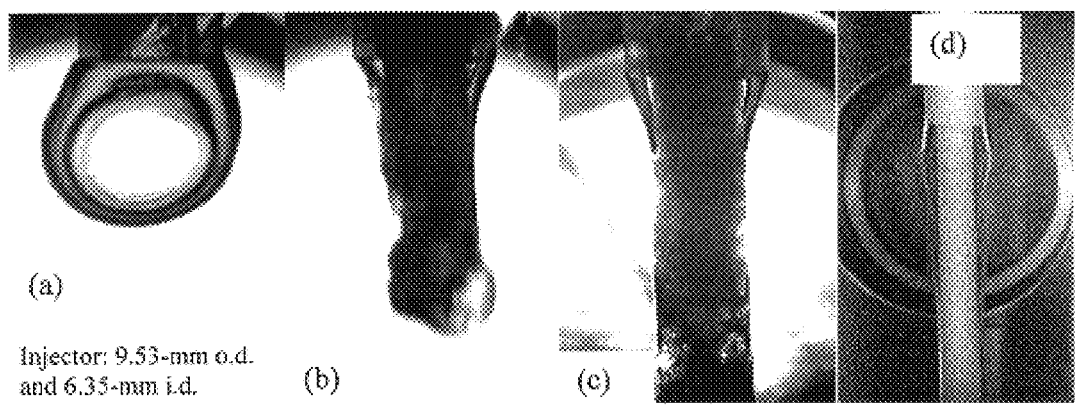
FIG. 3 is a series of photographs showing the production of a consolidated stream of $CO_2$-liquid/$CO_2$-hydrate/water achieved by mixing water with liquid $CO_2$ before injection in water at a temperature of 5° C. and a pressure equivalent to 1300 m of water.
Figure 4:
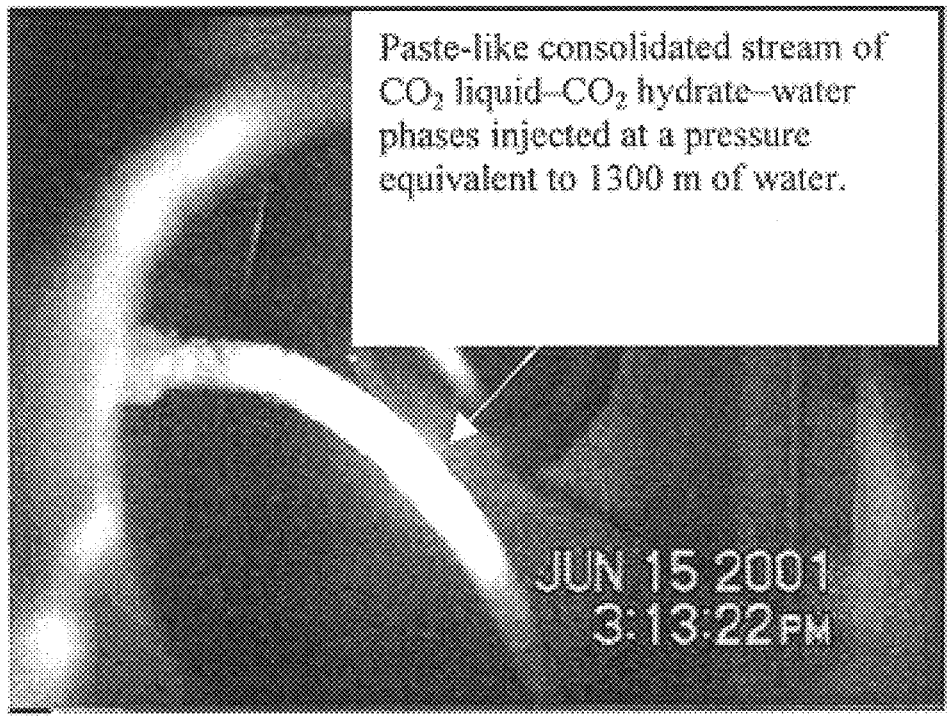
FIG. 4 is a photograph showing the injector of FIG. 3 mounted horizontally in the SPS test facility. The negatively buoyant consolidated stream of $CO_2$-liquid/$CO_2$-hydrate/water phases is produced at a pressure equivalent to a 1300-m ocean depth. The stream is observed to bend downward due to its negative buoyancy.

As expected from the prior art, injections in which seawater was not premixed with the $CO_2$ stream produced rising droplets of liquid $CO_2$, which eventually formed a thin translucent shell of $CO_2$ hydrate. By introducing water into liquid $CO_2$ through a capillary tube at varying flow-rate ratios, a paste-like stream of consolidated phases of $CO_2$ hydrate, liquid $CO_2$, and water under conditions typical of intermediate ocean depths (i.e., temperature=3–4° C., pressure=10.3–13.1 MPa) was achieved. This result is illustrated in FIG. 3, which shows the injector mounted vertically in the SPS in the direction of negative buoyancy. The photographs correspond to (a) a drop of liquid $CO_2$ released in water with no premixing with water; (b) transition from drops to a consolidated stream by mixing liquid $CO_2$ with water; (c, d) steady production of the negatively buoyant consolidated stream at 13.1 MPa, corresponding to 1300-m depth. More evidence for the negative buoyancy of the stream of hydrate-$CO_2$-water is shown in FIG. 4. In this case, the injector was positioned horizontally in the vessel and the injected stream is observed to bend downward because of its higher bulk density relative to that of seawater. We have also been able to generate a negatively buoyant $CO_2$ stream at pressures as low as 10.3 MPa, which corresponds to an ocean depth of ~1000 m.

Based on several sets of experiments in the SPS using both fresh and artificial seawater (3.5% NaCl), we have found that the density of the hydrate stream produced by our injection system depends on the ratio of water and liquid $CO_2$ flow rates, the total flow rate through the injector, the pressure at the injection point, and the mixing energy. A sinking stream was consistently produced if the ratio of the water to liquid $CO_2$ flow rates is greater than 3. However, lower water-to-liquid $CO_2$ flow rates are possible under better mixing conditions. The required flow-rate ratio appears to increase with decreasing pressure. For example, for 10.3 and 13.1 MPa, the water-to-$CO_2$ ratios of 5 and 3 are required, respectively. A stream composed of a 25:8 volumetric mixture of liquid $CO_2$ and water progressed from positive to negative buoyancy as the pressure was increased from 10.3 MPa to 13.1 MPa. The effect of higher pressure likely results from a greater driving force for the conversion of $CO_2$ to $CO_2$ hydrate, as well as the presence of compressible liquid $CO_2$ in the consolidated stream. A greater mixing intensity, which occurs at higher total flow rates through the injector, provided a larger interfacial area between water and liquid $CO_2$, thus increasing the mass transfer rate between $CO_2$ and water and increasing the surface areas on which hydrates can nucleate and grow. Therefore, the combination of higher pressure and mixing intensity lead to a greater reaction rate for $CO_2$ hydrate formation and an increase in the bulk density of the hydrate stream produced by our injector.

Using our method of premixing seawater into a $CO_2$ stream, a negatively buoyant $CO_2$ hydrate-liquid $CO_2$-water stream is able to be produced at intermediate ocean depths (~700 to 1500 m). Such a development is significant because it generates a sinking stream at depths <1500 m, and will prolong the metastability of $CO_2$ in seawater. Because implementation costs increase significantly with injection depth, this approach allows $CO_2$ injections to be performed not only with a lower risk of leakage to the atmosphere but also without significant increase in operating cost when compared with other proposed injection methods. Also, because of its low surface-to-volume ratio, the produced stream is expected to have a slower dissolution rate than that of a similar volume of liquid $CO_2$ in the form of a droplet plume. This slower rate will reduce the potential for low-pH conditions surrounding the injector, thereby decreasing the negative impact of direct $CO_2$ injections on the ocean environment.

While there has been shown and described what are at present considered the preferred embodiments of the invention, it will be obvious to those skilled in the art that various changes and modifications can be prepared therein without departing from the scope of the inventions defined by the appended claims.

We claim:

1. A method for sequestering $CO_2$ in the ocean comprising the steps of:
   pumping liquid $CO_2$ into a discharge pipe located at a predetermined ocean depth;
   pumping seawater from said predetermined ocean depth into said discharge pipe;
   sufficiently mixing said liquid $CO_2$ with said seawater from said predetermined ocean depth for a sufficient amount of time until a paste-like consolidated $CO_2$-hydrate/$CO_2$-liquid/water stream is formed; and
   discharging said paste-like consolidated $CO_2$-hydrate/$CO_2$-liquid/water stream into the ocean.

2. The method of claim 1 wherein said ocean depth is greater than 700 m, such that pressures are sufficiently high for $CO_2$ hydrate to be stable.

3. The method of claim 1 wherein said $CO_2$ temperature and said seawater temperature are less than the temperature for $CO_2$ hydrate stability corresponding to said predetermined ocean depth.

4. The method of claim 1 wherein the flow rate ratio of said seawater flow to said liquid $CO_2$ fluid flow is greater than 0.4.

* * * * *